United States Patent
Lee et al.

(10) Patent No.: US 9,544,932 B2
(45) Date of Patent: Jan. 10, 2017

(54) METHOD AND DEVICE FOR TRANSMITTING AND RECEIVING SIGNAL FOR DEVICE-TO-DEVICE COMMUNICATION IN WIRELESS COMMUNICATION SYSTEM

(71) Applicant: LG ELECTRONICS INC., Seoul (KR)

(72) Inventors: Jihyun Lee, Anyang-si (KR); Hanbyul Seo, Anyang-si (KR); Hyukjin Chae, Anyang-si (KR); Seungmin Lee, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 14/411,045

(22) PCT Filed: Jun. 13, 2013

(86) PCT No.: PCT/KR2013/005227
§ 371 (c)(1),
(2) Date: Dec. 23, 2014

(87) PCT Pub. No.: WO2014/003342
PCT Pub. Date: Jan. 3, 2014

(65) Prior Publication Data
US 2015/0341878 A1 Nov. 26, 2015

Related U.S. Application Data

(60) Provisional application No. 61/664,739, filed on Jun. 26, 2012.

(51) Int. Cl.
*H04W 76/02* (2009.01)
*H04W 56/00* (2009.01)
(Continued)

(52) U.S. Cl.
CPC ......... *H04W 76/023* (2013.01); *H04W 40/244* (2013.01); *H04W 56/004* (2013.01);
(Continued)

(58) Field of Classification Search
None
See application file for complete search history.

(56) References Cited

U.S. PATENT DOCUMENTS

2010/0093364 A1 4/2010 Ribeiro
2010/0302998 A1 12/2010 Bao et al.
(Continued)

FOREIGN PATENT DOCUMENTS

KR 10-2011-0103852 A 9/2011
WO 2011-161560 A1 12/2011

OTHER PUBLICATIONS

Fodor et al. "Design Aspects of Network Assisted Device-to-Device Communications", IEEE Communications Magazine, Mar. 2012 pp. 170-177.*

*Primary Examiner* — Joseph Bednash
(74) *Attorney, Agent, or Firm* — Dentons US LLP

(57) ABSTRACT

One embodiment of the present invention relates to a method for enabling a first user equipment (UE) to transmit and receive a signal for device-to-device (D2D) communication in a wireless communication system, and the method for transmitting and receiving a signal for D2D communication comprises the steps of: acquiring downlink synchronization of a serving cell in a second UE; transmitting a random access preamble to the serving cell in the second UE; receiving a random access response including timing advance as a response to the random access preamble transmission; and receiving a beacon signal transmitted by the second UE using the timing advance.

10 Claims, 14 Drawing Sheets

(51) Int. Cl.
  *H04W 40/24*  (2009.01)
  *H04W 72/04*  (2009.01)
  *H04W 74/08*  (2009.01)
  *H04W 88/02*  (2009.01)
(52) U.S. Cl.
  CPC ..... *H04W 72/042* (2013.01); *H04W 72/0453* (2013.01); *H04W 74/0833* (2013.01); *H04W 88/02* (2013.01)

(56) References Cited

U.S. PATENT DOCUMENTS

| | | | |
|---|---|---|---|
| 2011/0134827 A1 | 6/2011 | Hooli et al. | |
| 2013/0059583 A1* | 3/2013 | Van Phan | H04W 72/04 455/435.1 |
| 2013/0223352 A1* | 8/2013 | Sartori | H04W 76/023 370/329 |
| 2014/0099950 A1* | 4/2014 | Mildh | H04W 56/001 455/434 |
| 2014/0122607 A1* | 5/2014 | Fodor | H04W 76/023 709/204 |
| 2014/0161117 A1* | 6/2014 | Sebire | H04W 56/0045 370/350 |
| 2015/0156619 A1* | 6/2015 | Fodor | H04W 8/005 455/434 |

* cited by examiner

METHOD AND DEVICE FOR TRANSMITTING AND RECEIVING SIGNAL FOR DEVICE-TO-DEVICE COMMUNICATION IN WIRELESS COMMUNICATION SYSTEM

This application is a National Stage entry of International Application No. PCT/KR2013/005227, filed on Jun. 13, 2013, which claims priority to U.S. Provisional Application No. 61/664,739 filed Jun. 26, 2012, all of which are incorporated by reference herein in their entirety.

TECHNICAL FIELD

The present invention relates to a wireless communication system, and more particularly, to a method and device for transmitting and receiving a beacon signal for device-to-device (D2D) communication.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

Device-to-device (D2D) communication represents a communication scheme of establishing a direct link between user equipments (UEs) such that the UEs directly exchange services such as voice and data without assistance from an evolved NodeB (eNB). D2D communication may include UE-to-UE communication and peer-to-peer communication. In addition, the D2D communication scheme may be applied to machine-to-machine (M2M) communication, machine type communication (MTC), etc.

D2D communication is considered as one of measures to address load to an eNB according to rapidly increasing data traffic. For example, according to D2D communication, since devices exchange data directly, not through an eNB as in the conventional wireless communication systems, network load may be reduced. In addition, with introduction of D2D communication, procedures for the eNB may be simplified, power consumption of devices participating in D2D communication may be reduced, data transmission rate may increase, the capacity of a network may increase, load may be distributed, and cell coverage may be extended.

DISCLOSURE

Technical Problem

An object of the present invention is to provide a method for transmitting and receiving a beacon signal at user equipments operating in serving cells with different frequency bands in order to perform D2D communication.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is a method for transmitting and receiving a signal for device-to-device (D2D) communication by a first user equipment (UE) in a wireless communication system, the method including acquiring downlink synchronization of a serving cell of a second UE, transmitting a random access preamble to the serving cell of the second UE, receiving a random access response containing timing advance in response to transmission of the random access preamble, and receiving a beacon signal transmitted by the second UE, using the timing advance.

According to a second aspect of the present invention, provided herein is a first user equipment (UE) for transmitting and receiving a signal for device-to-device (D2D) communication in a communication system, including a receive module, and a processor, wherein the processor is configured to acquire downlink synchronization of a serving cell of a second UE, transmit a random access preamble to the serving cell of the second UE, receive a random access response containing timing advance in response to transmission of the random access preamble, and receive a beacon signal transmitted by the second UE, using the timing advance.

The first and second aspects of the present invention may include the following details.

When the first UE receives the beacon signal, the first UE may assume that the timing advance is timing advance of the second UE.

When a carrier indicator field is unconfigurable for the first UE, the first UE may switch a frequency band of a receiver to a downlink frequency band of the second UE in order to acquire downlink synchronization of the serving cell of the second UE.

The first UE may switch the frequency band of the receiver to an uplink frequency band of the second UE in order to receive the beacon signal transmitted by the second UE.

When a carrier indicator field is configurable for the first UE, and a frequency band of a secondary cell related to a serving cell of the first UE matches a downlink frequency band of the second UE, the first UE may request carrier aggregation reconfiguration.

The first UE may switch a frequency band of a receiver for the secondary cell to a frequency band related to the second UE.

Switching between the frequency bands may be performed to acquire the downlink synchronization and receive the beacon signal.

The method may further includes transmitting information related to an acknowledgement of reception of the beacon signal to the second UE, wherein the information transmitted to the second UE may be forwarded to the serving cell of the second UE.

The information related to the acknowledgement of reception of the beacon signal may be transmitted through a resource region indicated in a scan request, the scan request being transmitted by a serving cell of the first UE.

The information related to the acknowledgement of reception of the beacon signal may be transmitted through a resource region indicated in the random access response.

The method may further include transmitting information related to an acknowledgement of reception of the beacon signal to the serving cell of the second UE, wherein the information related to the acknowledgement of reception of the beacon signal may be transmitted through a resource region indicated in the random access response.

The beacon signal from the second UE may be received in an uplink frequency band of the second UE.

An operating frequency of a serving cell of the first UE may be different from an operating frequency of the serving cell of the second UE.

Advantageous Effects

According to embodiments of the present invention, a UE may effectively receive a beacon signal transmitted from another UE belonging to a serving cell using a different frequency band than the serving cell thereof.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
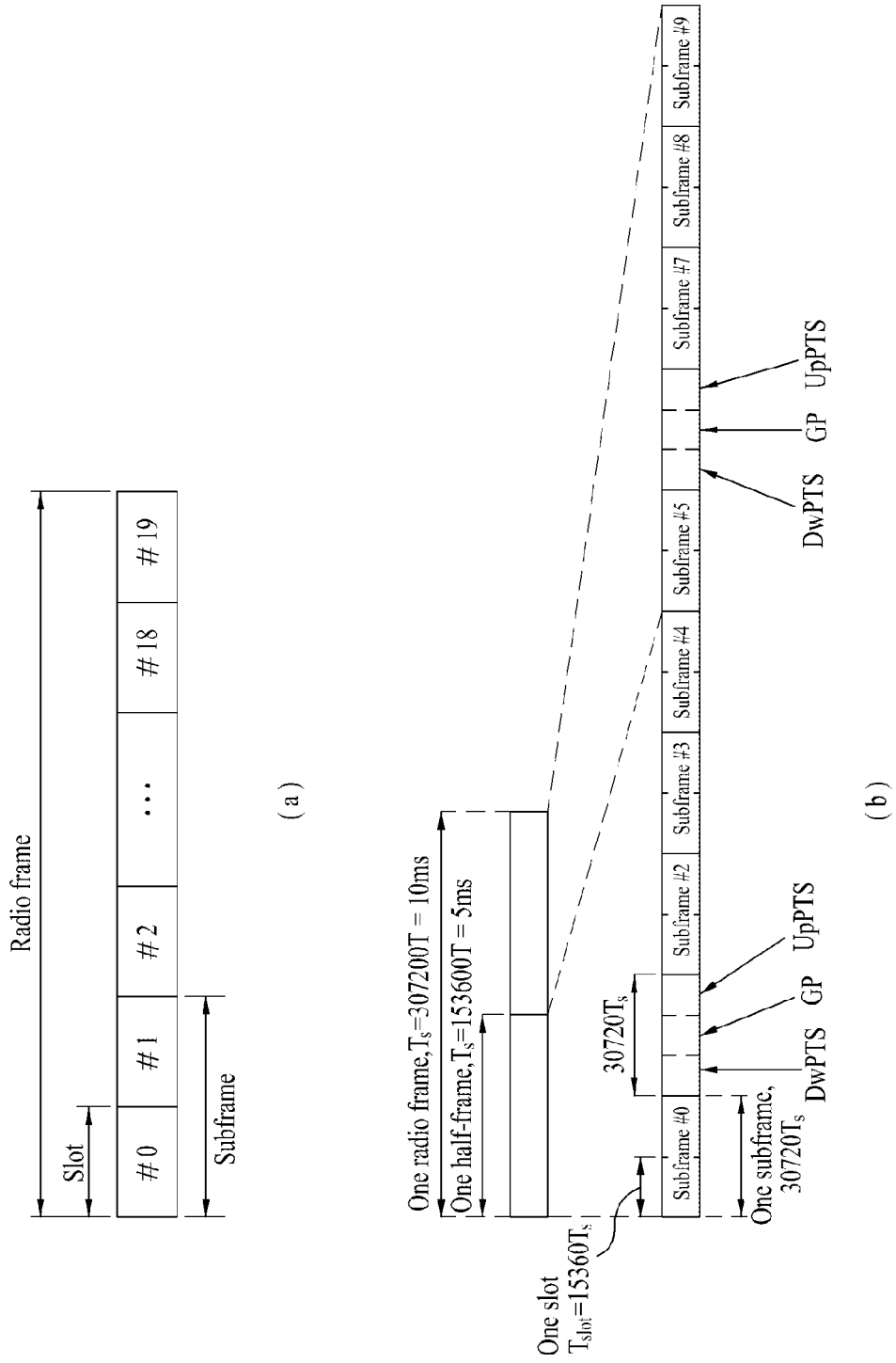
FIGS. 1(a) and (b) illustrate a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communications (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802.20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

Fundamentals of LTE/LTE-A System to which the Present Invention is Applicable

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
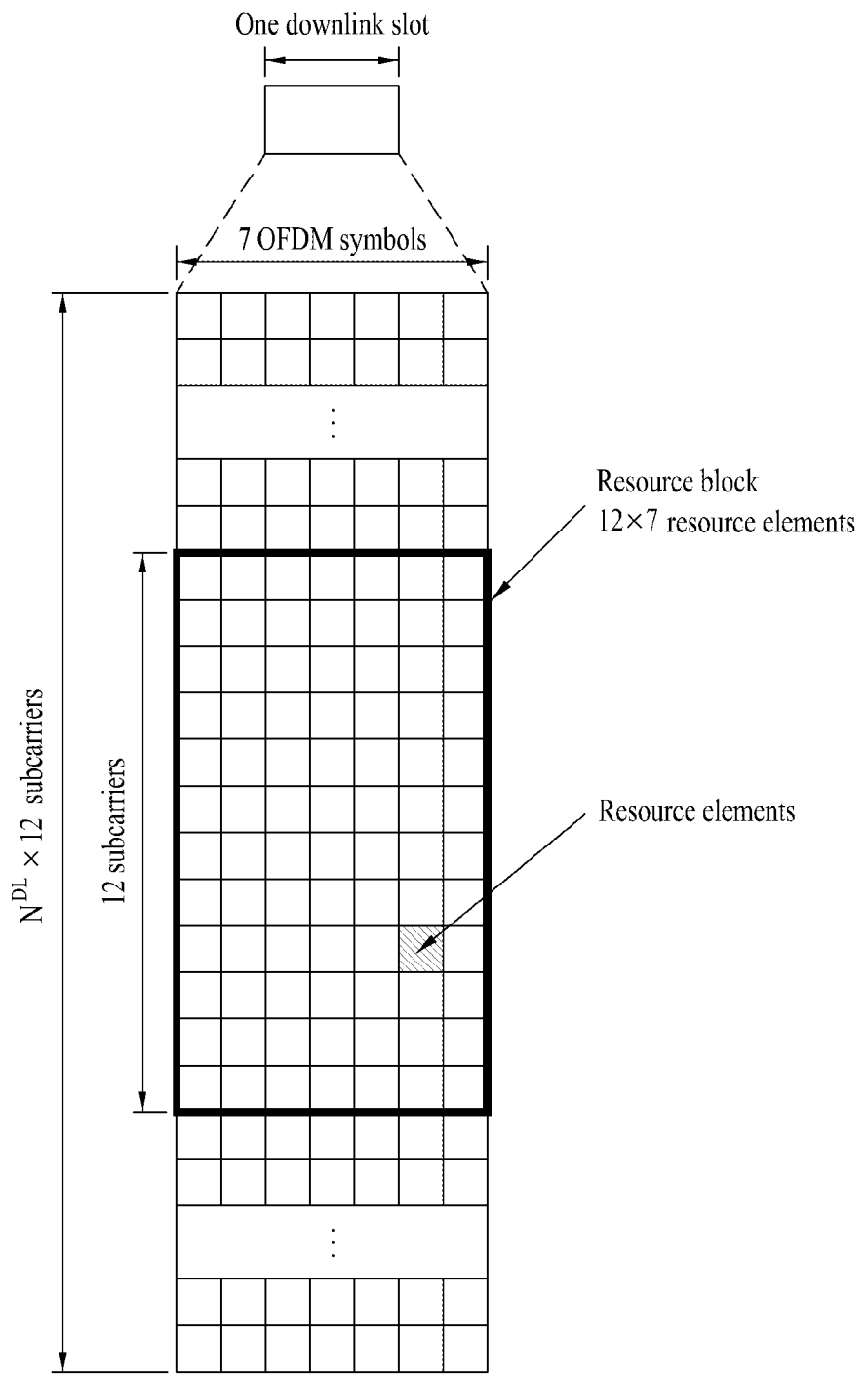
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
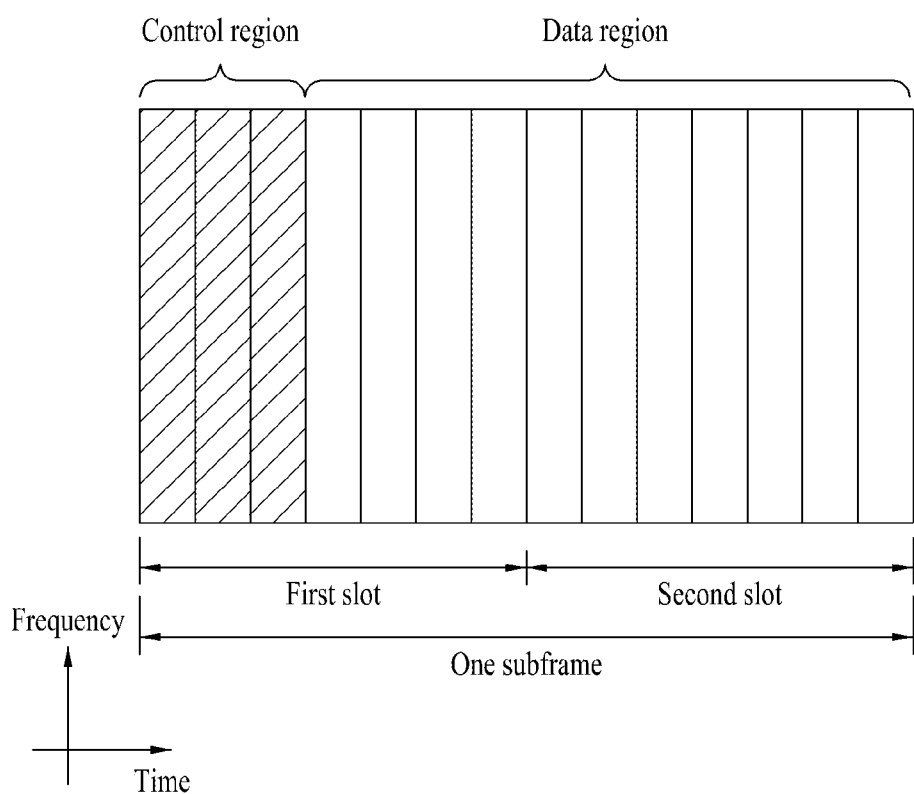
FIG. 3 is a diagram illustrating a DL subframe structure.

FIG. 3 illustrates a DL subframe structure. Up to first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
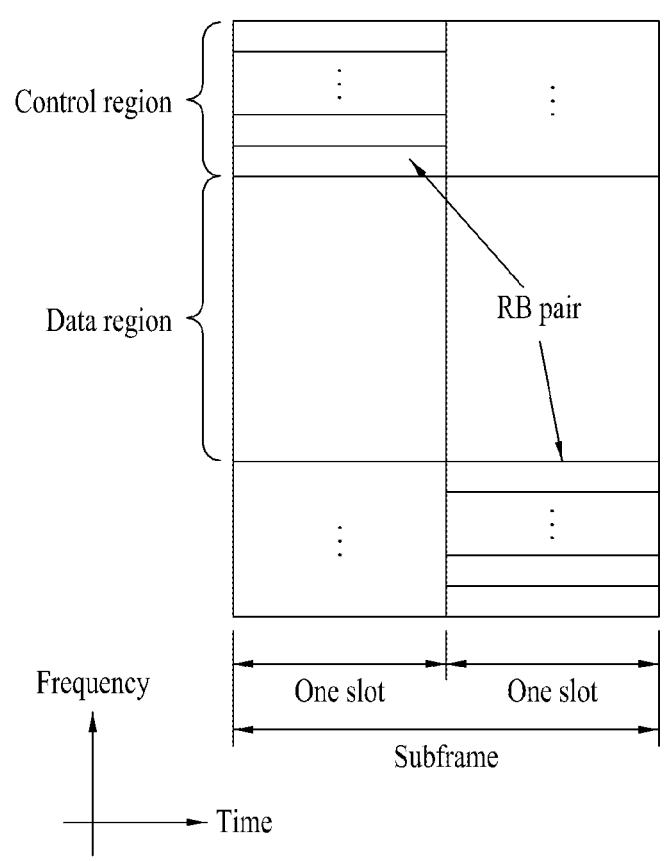
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Carrier Aggregation

Figure 5:
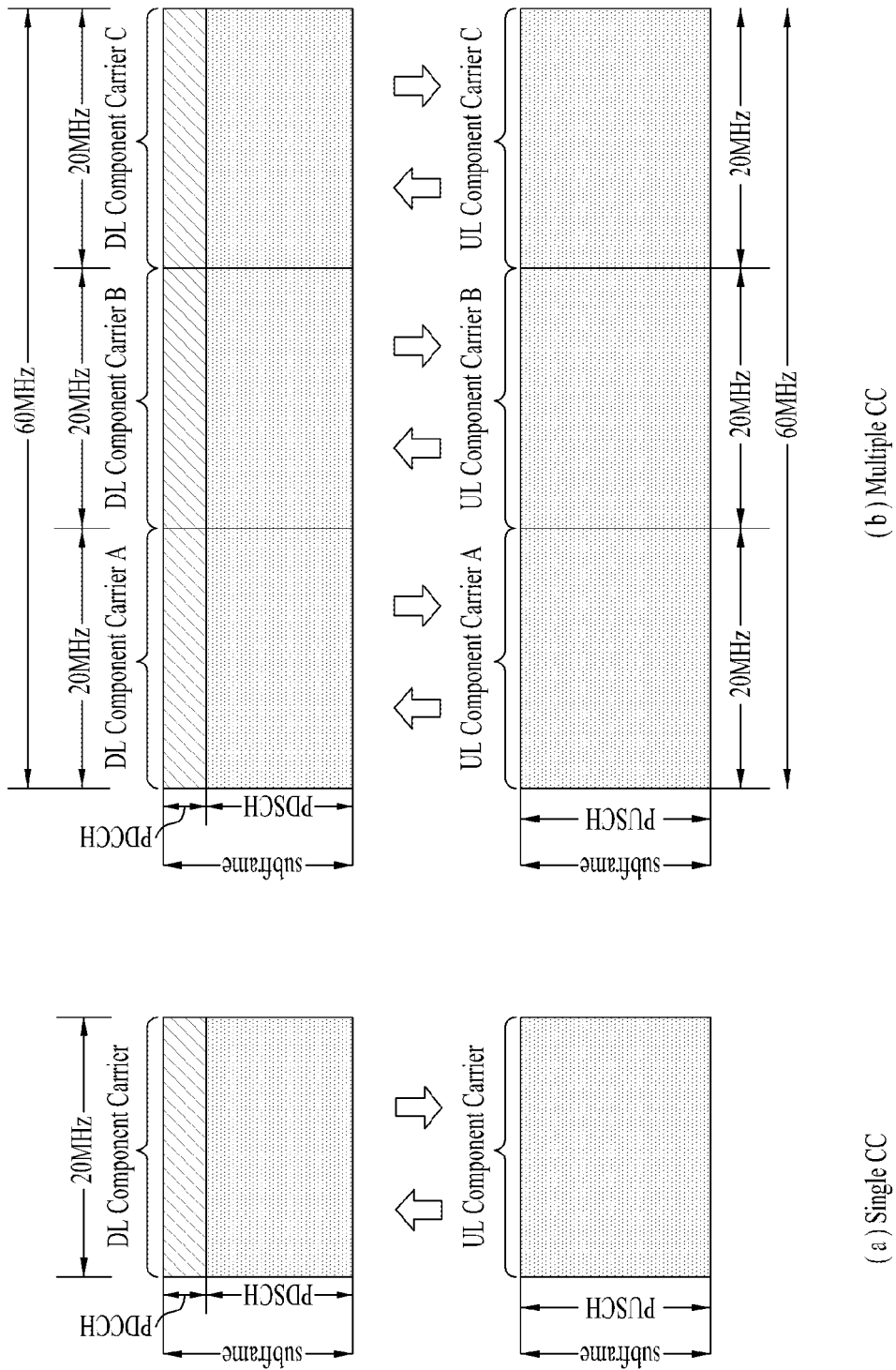
FIGS. 5 and 6 illustrate carrier aggregation.

FIG. 5 illustrates carrier aggregation (CA). Before description is given of carrier aggregation, the concept of cell introduced to manage radio resources in LTE-A will be described first. A cell may be understood as a combination of downlink resources and uplink resources. Here, the uplink resource is not an essential element for the cell. Accordingly, a cell may include only downlink resources or include downlink resources and uplink resources. However, while this definition is established in the current LTE-A Release 10, a cell may include only uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support the carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Hereinafter, carrier aggregation will be described with reference to FIG. 5. Carrier aggregation is a technology that has been introduced to allow for use of a broader band in order to meet the requirements of a high-speed transmission rate. Carrier aggregation may be defined as an aggregation of two or more component carriers (CCs), each having a different frequency. Referring to FIG. 5, FIG. 5(a) illustrates a subframe in a case when one CC is used in the legacy LTE system, and FIG. 5(b) illustrates a subframe in a case when carrier aggregation is used. For example, in FIG. 5(b), 3 CCs of 20 MHz are used, thereby supporting a bandwidth of 60 MHz. Herein, CCs may be continuous or non-continuous.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to have M(<N) CCs. Various parameters for carrier aggregation may be set up in a cell-specific, UE group-specific, or UE-specific manner.

Figure 6:
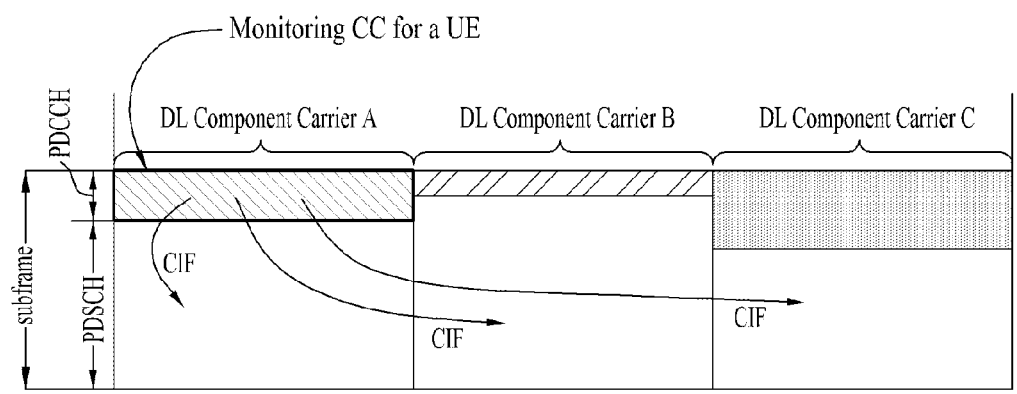

FIG. 6 illustrates cross-carrier scheduling. Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

A carrier indicator field (CIF) will be described first.

As described above, the CIF may either be included or not included in the DCI format, which is transmitted over the PDCCH. If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, referring to FIG. 6, downlink allocation information about DL CC B and DL CC C, i.e., information about PDSCH resources is transmitted over the PDCCH within the control region of DL CC A. The UE may monitor DL CC A so as to recognize the resource region of the PDSCH and the corresponding CC through the CIF.

Whether the CIF is included or not included in the PDCCH may be semi-statically set, and the CIF may be UE-specifically enabled by higher-layer signaling. When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. Even in this case, the same coding scheme, CCE-based resource mapping, DCI format, and so on, as in the legacy PDCCH structure may be applied.

When the CIF exists, an eNB may allocate a DL CC set in which the PDCCH is to be monitored. Accordingly, the burden of blind decoding to the UE may be lessened. The PDCCH monitoring CC set corresponds to a portion of the entire aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated as illustrated in FIG. 6, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDSCCH is not transmitted in DL CC B and the DL CC C.

In a system adopting carrier aggregation described above, the UE may receive multiple PDSCHs through multiple downlink carriers. In this case, there may occur a case when the UE needs to transmit ACK/NACK for each datum in one UL CC within a single subframe. When multiple ACKs/NACKs are transmitted in a single subframe by using PUCCH format 1a/1b, a high transmit power may be required, Peak Power to Average Ratio (PAPR) of uplink transmission may increase, and inefficient use of a transmit power amplifier may result in decrease in the available distance by which transmission from the eNB of the UE is feasible. In order to transmit multiple ACKs/NACKs through a single PUCCH, ACK/NACK bundling or ACK/NACK multiplexing may be applied.

Additionally, there may occur a case when ACK/NACK information for a large number of downlink data sets according to application of carrier aggregation and/or ACK/NACK information for a large number of downlink data sets transmitted from a TDD system in a plurality of DL subframes needs to be transmitted over the PUCCH in a single subframe. In this case, if the number of ACK/NACK bits to be transmitted is larger than the number of bits supportable through ACK/NACK bundling or multiplexing, the ACK/NACK information may not be correctly transmitted by using the above-described methods.

Random Access Procedure

In LTE, a UE can perform the random access procedure in the following situations.

The UE performs initial access since the UE does not have RRC connection to an eNB.

The UE accesses a target cell for the first time in a handover procedure.

The random access procedure is requested by a command of the eNB.

Data for uplink is generated in a situation in which uplink time synchronization is not established or a predetermined radio resource used to request a radio resource is not allocated.

A recovery procedure is performed due to radio link failure or handover failure.

Hereinafter, a typical contention-based random access procedure under the above situations will be described.

Figure 7:
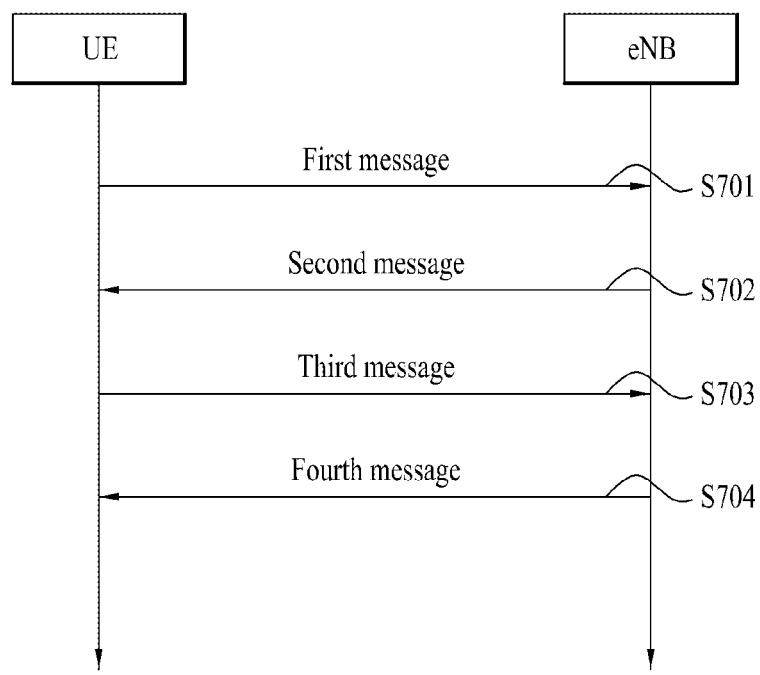
FIG. 7 illustrates a random access procedure.

FIG. 7 is a diagram illustrating operational processes for a UE and an eNB in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S701).

(2) Reception of Second Message

After transmitting the random access preamble, the UE attempts to receive a random access response thereof within a random access response reception window indicated through the system information or Handover Command by an eNB (S702). More specifically, the random access response information may be transmitted in the format of a MAC (Media Access Control) PDU (Protocol Data Unit) and the MAC PDU may be transmitted on a PDSCH. To properly receive the information transmitted on the PDSCH, the UE preferably monitors a physical downlink control channel (PDCCH). That is, the PDCCH preferably carries information about a UE to receive the PDSCH, frequency and time information about radio resources of the PDSCH, and information about the transmission format of the PDSCH. Once the UE succeeds in receiving a PDCCH transmitted thereto, the UE may properly receive the random access response on the PDSCH based on the information of the PDCCH. The random access response may include a random access preamble identifier (RAPID), a UL Grant indicating UL radio resources, a Temporary C-RNTI, and a Timing Advance Command (TAC).

As described above, the RAPID is needed in the random access response to indicate a UE for which the UL Grant, the Temporary C-RNTI, and the TAC are valid since one random access response may include random access response information for one or more UEs. It is assumed in this step that the UE selects a RAPID identifying the random access preamble that has been selected in step S702. Thus, the UE may receive the UL Grant, the Temporary C-RNTI, and the timing advance command (TAC).

(3) Transmission of Third Message

If the UE receives a valid random access response, the UE processes the information included in the random access response. That is, the UE applies the TAC and stores the Temporary C-RNTI. In addition, the UE may store data to be transmitted in a message-3 buffer, in response to the received valid random access response.

The UE transmits the data (i.e., a third message) to the eNB based on the received UL Grant (S703). The third message should include an ID of the UE. This is because the eNB cannot determine which UEs perform the random access procedure in the contention-based random access procedure and the UEs need to be identified for contention resolution.

Two methods have been discussed to include a UE ID in the third message. According to a first method, if the UE has a valid C-RNTI already allocated by a corresponding cell before the random access procedure, the UE transmits the C-RNTI by a UL transmission signal corresponding to the UL Grant. On the other hand, if a valid C-RNTI has not been allocated to the UE before the random access procedure, the UE transmits its unique ID (e.g., an SAE Temporary Mobile Subscriber Identity (S-TMSI) or a Random ID) in the third message. In general, a UE ID is longer than a C-RNTI. Once the UE has transmitted data corresponding to the UL Grant, the UE starts a contention resolution timer (hereinafter referred to as "CR timer").

(4) Reception of Fourth Message

After the UE transmits the data including the ID thereof according to the UL Grant included in the random access response, the UE awaits instruction from the eNB, for contention resolution. That is, the UE attempts to receive a PDCCH in order to receive a specific message (S704). There are two methods for receiving the PDCCH. As described above, if the third message transmitted according to the UL Grant includes a C-RNTI, the UE attempts to receive a PDCCH using the C-RNTI thereof. If the third message includes the UE ID, the UE may attempt to receive a PDCCH using the Temporary C-RNTI included in the random access response. In the former case, if the UE receives the PDCCH using the C-RNTI thereof before the CR timer expires, the UE determines that the random access procedure has been normally performed and terminates the random access procedure. In the latter case, if the UE receives a PDCCH using the Temporary C-RNTI before the CR timer expires, the UE checks data received on a PDSCH indicated by the PDCCH. If the data includes the ID of the UE, the UE determines that the random access procedure has been normally performed and terminates the random access procedure.

In the case of non-contention-based random access, the random access procedure is terminated simply by transmitting the first and second messages, unlike the case of the contention-based random access procedure illustrated in FIG. 7. Note that before the UE transmits a random access preamble as the first message to the eNB, the eNB allocates the random access preamble to the UE. The UE transmits the allocated random access preamble as the first message to the eNB and receives a random access response from the eNB. Thereby, the random access procedure is terminated.

D2D Communication Between UEs Included in Cells Having Different Bandwidths

Hereinafter, a method for transmitting and receiving signals at UEs to perform D2D communication will be described based on the details described above. More specifically, a method for discovering, at a specific D2D UE, another UE belonging to a serving cell operated in a frequency band different from the operating frequency band of the serving cell for the specific D2D UE will be described. Herein, the UE may be capable of supporting dual/multi band and thus performing transmission/reception at two or more operator frequencies. That is, the UE may be subscribed to two or more operators or only to a specific operator, and may be capable of performing reception in two or more frequency bands but allowed to perform transmission only in the frequency band of the operator to which it has subscribed. The description given below may also be applied when the processes of the network receiving a request for D2D communication, issuing, to a UE involved in D2D communication, a command to perform beaconing and issuing, to another UE involved in D2D communication, a command (beacon request and ack/scan request) to perform scanning in the beaconing band/time are successfully completed. However, the description given below is not limited thereto, and may be applied to a case in which a beacon is transmitted in a predetermined interval without a command from the network.

Figure 8:
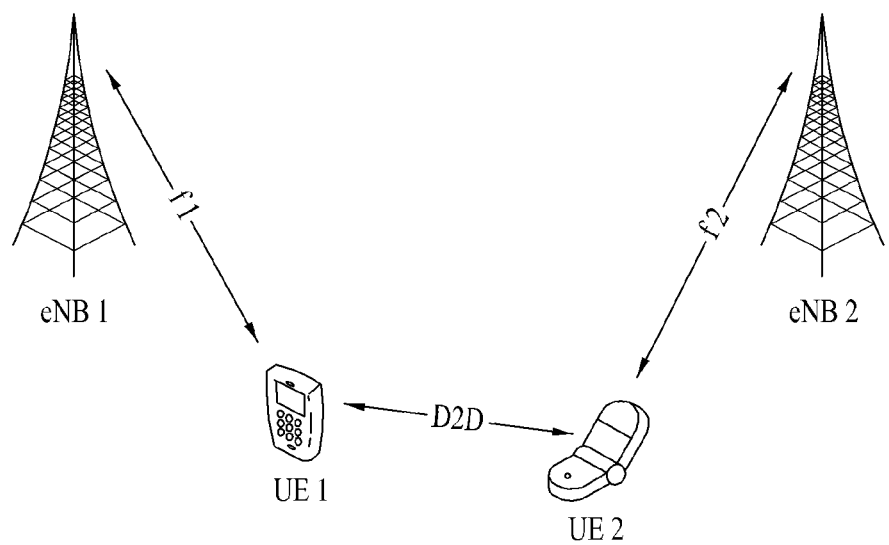
FIG. 8 is a diagram illustrating a network environment according to one embodiment of the present invention.
Figure 11:
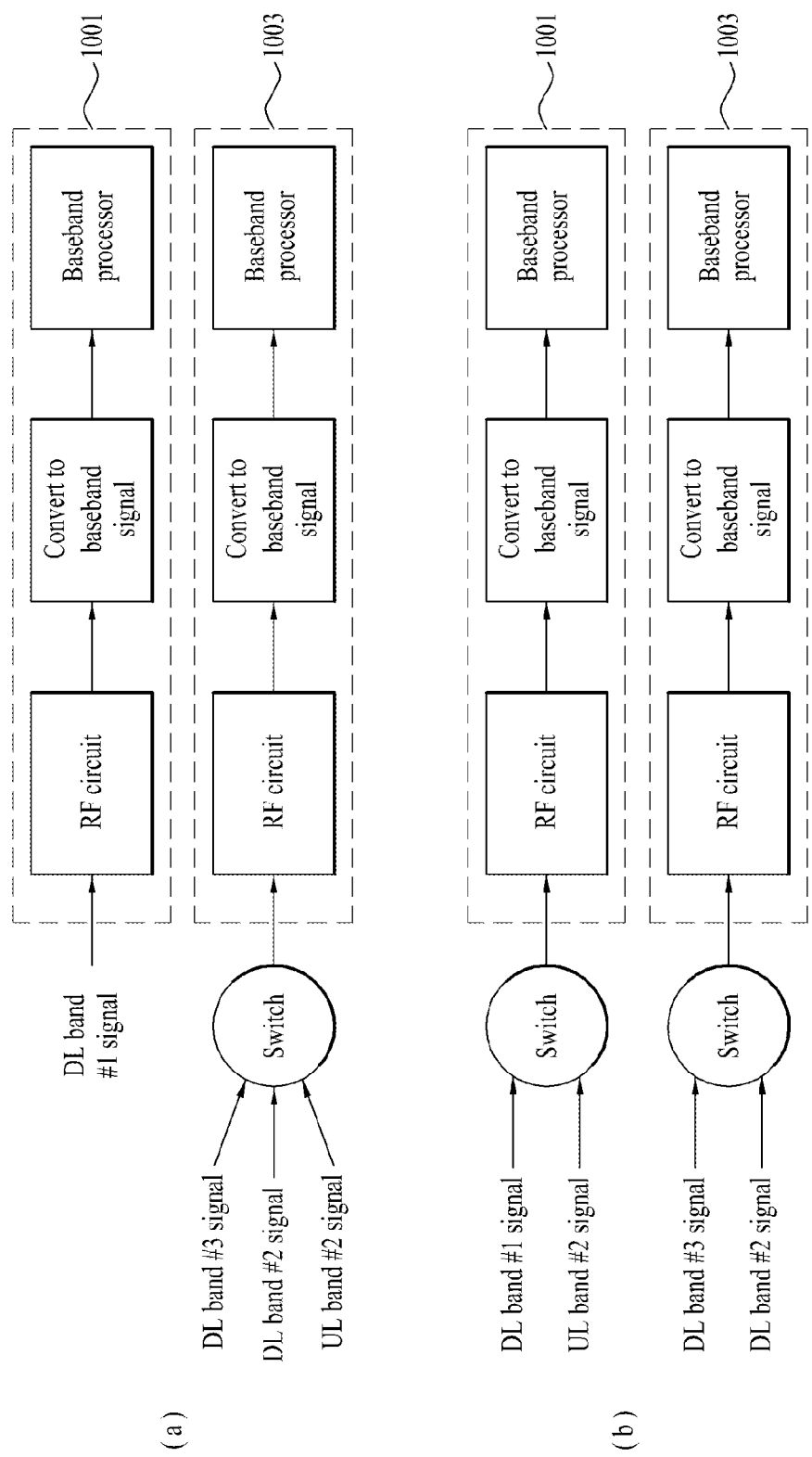

FIG. 8 is a diagram illustrating a network environment according to one embodiment of the present invention. Referring to FIG. 11, a first UE (UE1) and a second UE (UE2) respectively have a first eNB (eNB1) and a second eNB (eNB2) using different frequency bands as serving cells. In other words, UE1 is operatively connected to eNB1 of a first operator frequency f1, and UE2 is operatively connected to eNB2 of a second operator frequency f2. In the case of frequency division duplex (FDD), downlink and uplink are separated from each other for each operator frequency f1, f2. If UE1 has received a scan request and UE2 has received a beacon request in the discovery process, UE2 will periodically transmit a beacon signal. Herein, the resource for transmission of the beacon signal may be a D2D frequency band, i.e., an uplink frequency band (of the serving cell) of UE2. (Hereinafter, it will be assumed that the beacon signal is transmitted in the uplink frequency band of UE2, but embodiments of the present invention are not limited thereto. The beacon signal may be transmitted in any frequency band.)

In the situation given above, in order for UE1 to discover UE2 (i.e., to measure a direct link to UE2 or receive a beacon signal from UE2) to perform D2D communication, UE1 needs to switch to the frequency band in which the beacon signal of UE2 is transmitted, namely, to the uplink frequency band (of the serving cell) of UE2. In this case, UE1 may not be allowed to perform transmission/reception in the serving cell thereof within a specific time interval for measurement (a measurement interval). Herein, the measurement interval may be determined and signaled to the UE through, for example, a scan request by the network. In the measurement interval, eNB1 does not transmit any downlink signal to UE1, and further does not expect to receive an uplink signal. Additionally, even if UE1 switches to the uplink frequency band of UE2, UE1 may not be properly synchronized with UE2/eNB2, and as a result may not properly receive the beacon signal. Hereinafter, methods to address this case will be discussed.

Acquisition of Synchronization for Reception of Beacon Signal

As a method for UE1 to acquire synchronization for receiving a beacon signal transmitted from UE2, a simplified/modified random access procedure may be used.

First, UE1 acquires downlink synchronization (of the serving cell) of UE2. To this end, UE1 may receive synchronization signals (e.g. a primary synchronous signal (PSS) and a secondary synchronous signal (SSS)) and a physical broadcast channel (PBCH) which are transmitted from the serving cell of UE2. In a case in which UE1 cannot properly receive the signals exemplarily mentioned above from UE2 due to distance, interference from other neighboring cells, and the like, the scan request may contain information (information related to downlink synchronization of UE2 such as, for example, frame/subframe timing or timing offset information between the serving cell of UE1 and the serving cell of UE2) which may be acquired from the above signals.

A UE having acquired downlink synchronization of UE2 may transmit a random access preamble to the serving cell of UE2. Herein, the preamble may be the preamble defined in the legacy LTE/LTE-A system, or a preamble separately defined for this procedure. Upon receiving the random access preamble, the serving cell of UE2 may transmit a random access response in response. The random access response may include timing advance. The random access response may further include information about a resource region for transmission of an acknowledgement of reception of the beacon signal. The random access response may further include a random access preamble identifier (RAPID), a UL Grant indicating a UL radio resource, and a temporary C-RNTI. The simplified/modified random access procedure may be terminated with transmission of the random access response. In other words, the procedure of transmission and reception of the third message for UE identification subsequent to the random access response and the fourth message related to contention settlement in the legacy LTE/LTE-A system may be omitted. UE1 having received such random access response may receive a beacon signal transmitted by UE2, using the timing advance. Specifically, UE1 may determine uplink timing, assuming/believing/estimating that the acquired timing advance is the timing advance of UE2. Since UE1 has learned of uplink synchronization of UE2, the beacon signal which UE2 transmits on uplink may be properly received.

As another method to acquire synchronization for receiving a beacon signal transmitted from UE2, the beacon signal may be continuously scanned in the time axis after downlink synchronization of the serving cell of UE2 is acquired.

As a further method, UE1 may pre-acquire uplink synchronization of UE2 from the eNB. That is, this method provides an approximate timing value through cooperation between eNBs and heterogeneous networks. When a local clock is shared between heterogeneous operator networks, the downlink timing may be calculated as a difference in timing with respect to a global clock (which may employ the GPS clock). Additionally, eNB1 may acquire the TA value of UE2 from eNB2 and deliver the same to UE1.

The scan request which eNB1 transmits to UE1 may be viewed as functioning as an inter-operator network handover request to UE2 for UE1. The scan request may contain a measurement interval (a measurement period) and information about a cell to which handover is to be performed. The scan request may further contain timing information.

Switching Between Operating Frequency Bands for Receiving Beacon Signal

As described above, UE1 may acquire UE2-related downlink and/or uplink synchronization and receive a beacon signal. In this process, switching between operating frequency bands is needed. That is, switching of the operating frequency to the downlink frequency band of UE2 may be needed to acquire downlink synchronization of UE2, while switching of the operating frequency to the uplink frequency band of UE2 may be needed to receive a beacon signal. Hereinafter, a case in which UE1 has a single signal receive circuit and another case in which UE1 has two signal receive circuits (which correspond to, for example, a case in which UE1 supports carrier aggregation, namely the CIF is configurable for UE1) will be described respectively.

Figure 9:
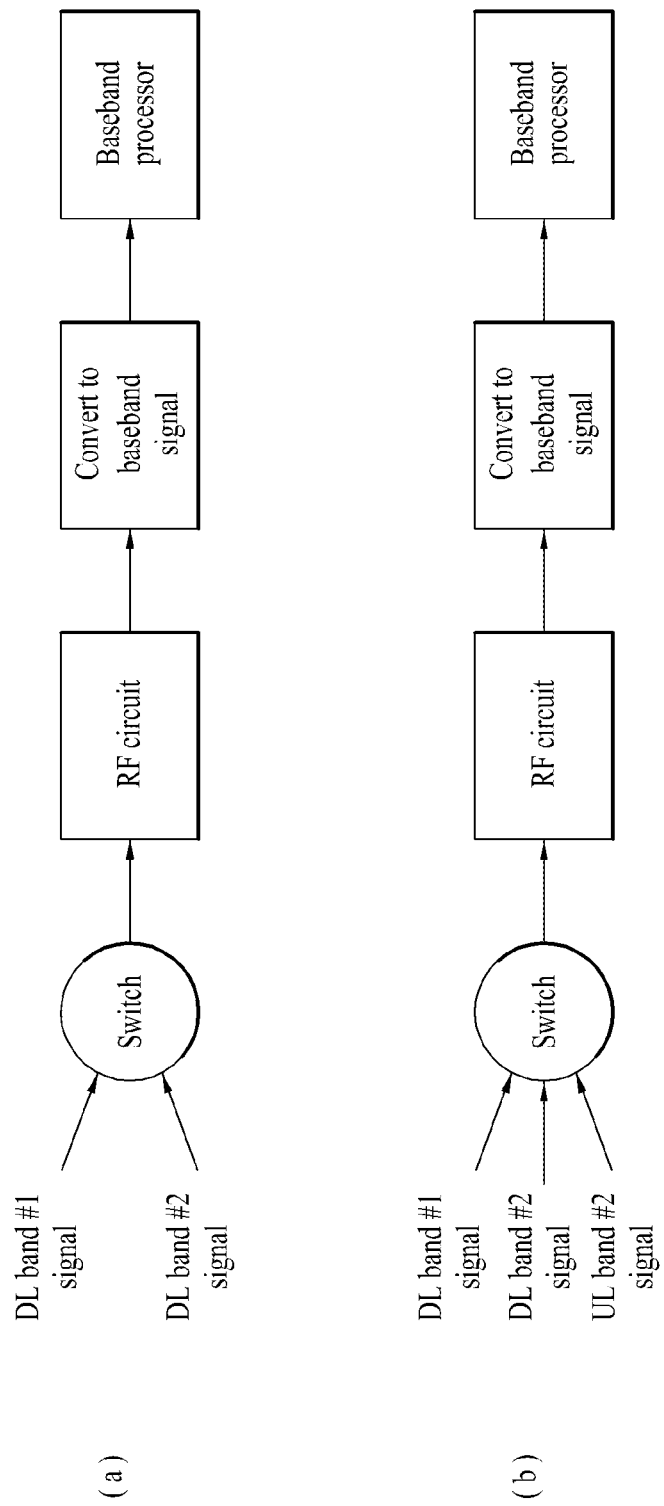
FIGS. 9(a) and (b), 10(a) and (b), and 11(a) and are diagrams illustrating switching of operating frequencies according to one embodiment of the present invention.

FIG. 9 illustrates a case in which a single signal receive circuit is implemented in UE1. FIG. 9(a) illustrates switching between different frequency bands to receive signals (DL band #1 signal and DL band #2 signal) of the different frequency bands in the case in which UE1 has a single signal receive circuit. In order for UE1 having such receive circuit to acquire timing information and receive a beacon signal, switching of operating frequencies as shown in FIG. 9(b) is needed. Specifically, referring to FIG. 9(b), when a UE receives a scan request during reception of an operating frequency band signal (DL band #1 signal) therefor, the UE may switch to the downlink operating frequency band of UE2 in the measurement interval to receive a signal (DL band #2 signal) transmitted in the downlink operating frequency band of UE2 in order to acquire downlink synchronization of UE2. Thereafter, the UE may switch to the uplink operating frequency band of UE2 in order to receive a beacon signal (UL band #2 signal) that UE2 transmits.

Figure 10:
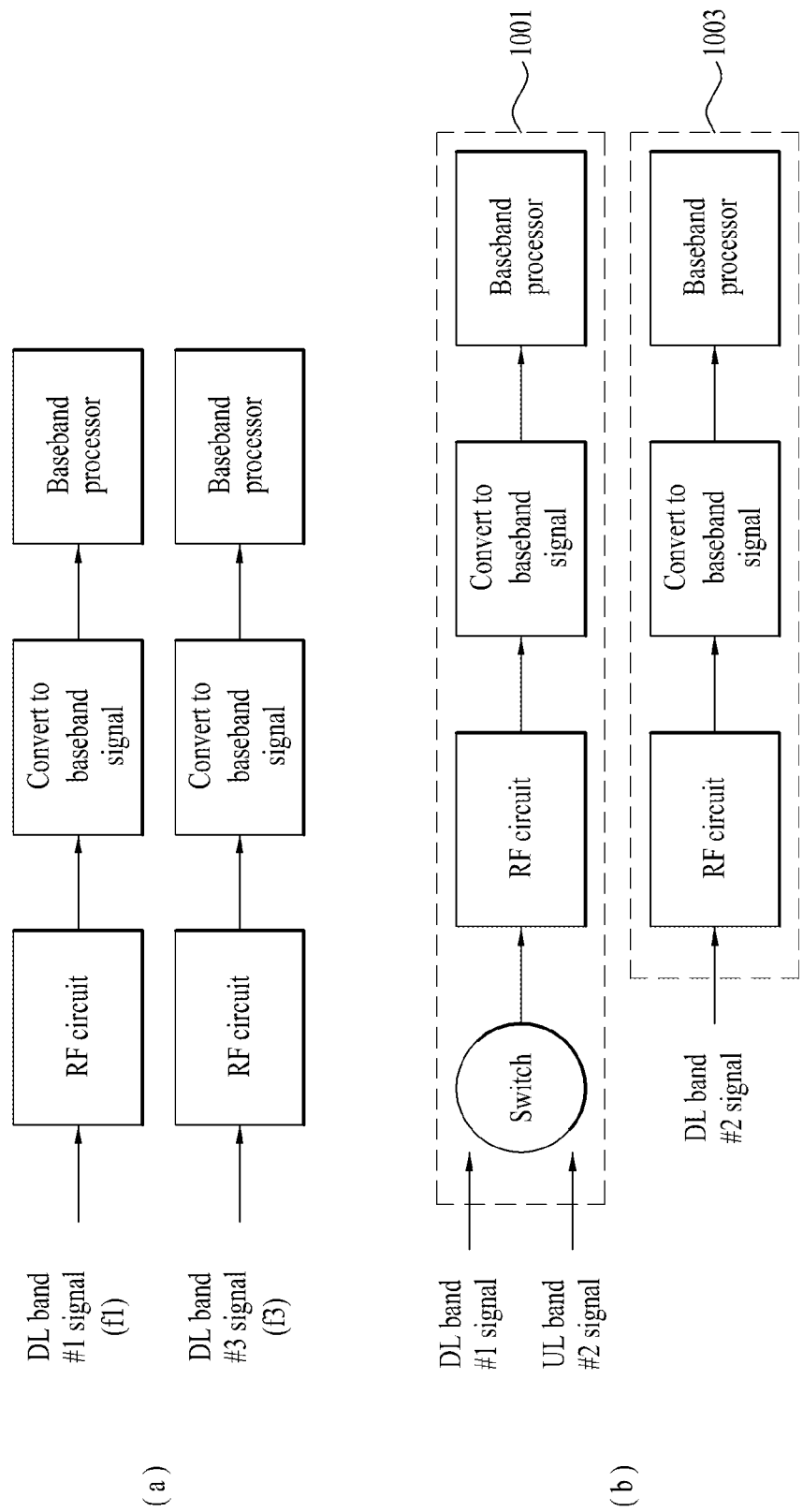

FIGS. 10 and 11 illustrate a case in which two signal receive circuits are implemented in UE1. As shown in FIG. 10(a), UE1 has two receive circuits. The receive circuit may receive signals of two frequency bands (DL band #1 signal and DL band #2 signal). Herein, a first frequency band f1 may be a primary cell, and a third frequency band f2 may be a secondary cell.

In FIG. 10(a), if the third frequency band f3 is identical to the downlink frequency band of UE2, UE1 may receive a downlink frequency band signal of UE2 (i.e., a signal for acquiring downlink synchronization of the serving cell of UE2, DL band #2 signal) through a second receive circuit 1003, while receiving a downlink signal in the first frequency band f1 (DL band #1 signal) through a first receive circuit 1001. Thereafter, UE1 may switch the frequency band at the first receive circuit 1001 to the uplink frequency band of UE2 to receive a beacon signal (UL band #2 signal) transmitted from UE2.

FIG. 11(a) illustrates a method of continuing to receive a signal in the first frequency band (a signal in the downlink frequency band of the serving cell of UE1), unlike the case of FIG. 10(b). That is, the first receive circuit 1001 switches the frequency band of the second receive circuit 1003, while continuing to receive the downlink signal (DL band #1 signal) in the first frequency band f1. Specifically, UE1 receives a downlink signal of the third frequency band f3 of the serving cell (DL band #3 signal) through the second receive circuit 1003. When the UE1 receives a scan request, UE1 may switch the frequency band to receive a signal of the second frequency band f2 (DL band #2 signal) in order to acquire downlink synchronization of the serving cell of UE2. Thereafter, upon acquiring synchronization of the serving cell of UE2, the UE may switch the frequency band of the second receive circuit 1003 to receive an uplink signal of the second frequency band (UL band #2 signal). Herein, the uplink signal of the second frequency band (UL band #2 signal) may represent a beacon signal which UE2 transmits.

In the description above, when the third frequency band f3 corresponds to the Scell carrier of the serving cell of UE1, it may be expected that the beacon signal of UE2 will be received using the receive circuit of Scell, while reception of the downlink signal of Pcell is maintained. Herein, after band switching in the receive circuit of Scell, namely the second receive circuit 1003, reception cannot be performed by Scell, and accordingly the network may perform carrier aggregation reconfiguration and inform UE1 of the reconfiguration through a scan request. Alternatively, UE1 may request carrier aggregation reconfiguration while making a request for a measurement interval. Herein, carrier aggregation reconfiguration may mean to deactivate the Scell such that the Scell is not scheduled momentarily (or in the measurement interval).

FIG. 11(b) illustrates receiving a beacon signal of UE2 by switching both receive circuits 1001 and 1003. Referring to FIG. 11(b), UE1 may switch the second receive circuit 1003 to the second frequency band to receive a signal (DL band #2 signal) for acquiring downlink synchronization of UE2. Thereafter, UE1 may switch the first receive circuit 1001 to the second frequency band to receive the beacon signal of UE2 (UL band #2 signal).

Report of Beacon Signal Reception

Upon successfully receiving the beacon signal of UE2 using the methods described above, UE1 may need to report reception to the network. Herein, as an exemplary method for reporting of beacon signal reception (information related to acknowledgement of reception of the beacon signal. Hereinafter, referred to as scan reporting), the method illustrated in FIG. 12 may be used.

Figure 12:
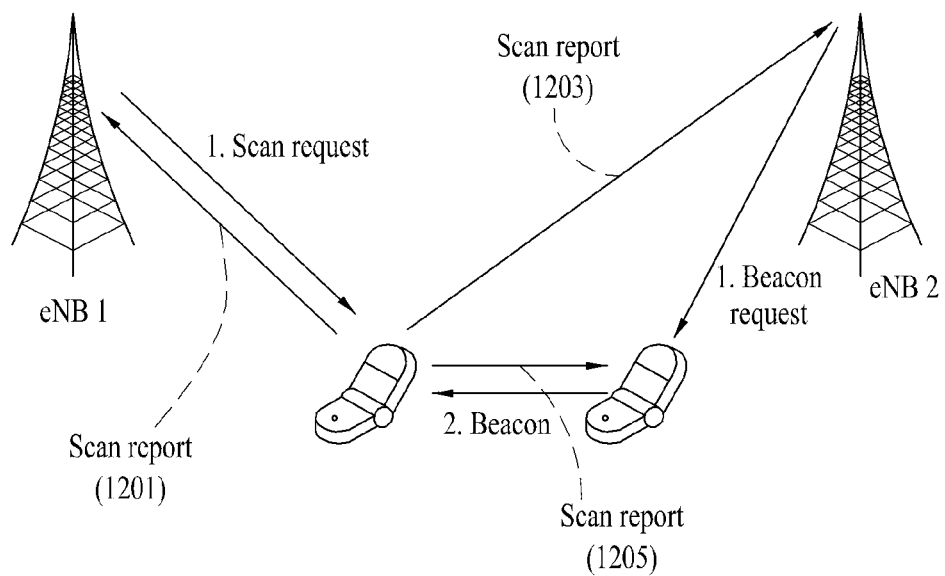
FIGS. 12 and 13 illustrate scan report according to one embodiment of the present invention.
Figure 13:
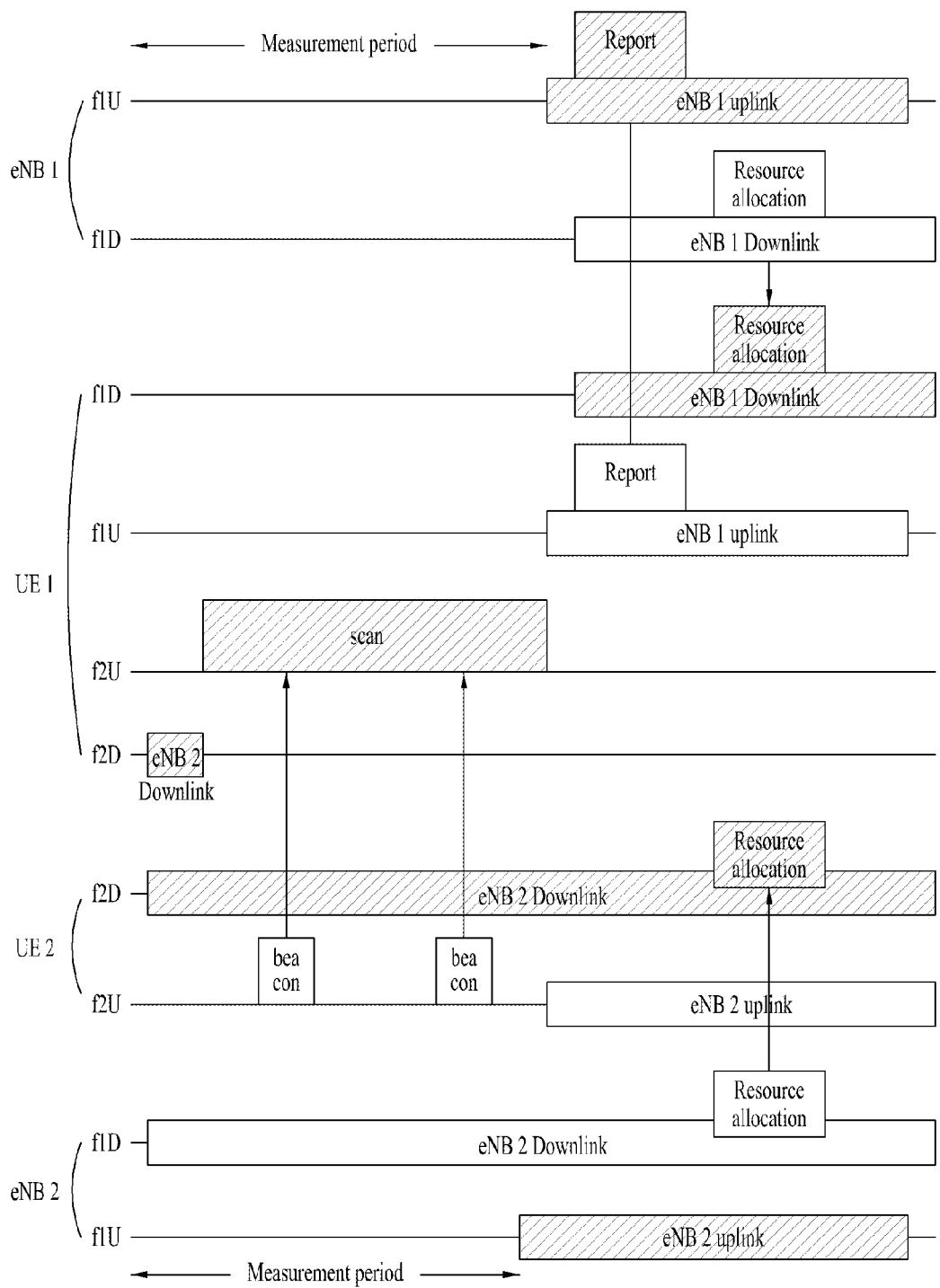

First, referring to FIG. 12, the scan report may be transmitted to the eNB of UE1 (1201). More specifically, when UE2 receives a beacon request from eNB2, UE2 broadcasts the beacon signal according to the measurement configuration. The transmit frequency of the beacon signal is in the UL band of f2, the operating frequency of UE2, and UL transmission to eNB2 is performed in a time interval other than the beacon transmission interval. Upon receiving a scan request from eNB1, UE1 receives the beacon signal transmitted from UE2, using the methods described above. Then, UE1 may return to its own operating frequency, f1, and report discovery of UE2 using a UL resource. When UE1 successfully discovers UE2, eNB1 may inform eNB2 of success of discovery and the measured signal information (e.g., channel state information, receive signal intensity, etc.), and allow D2D communication and perform D2D resource negotiation. Herein, the negotiation process may be omitted, and a predetermined D2D resource region may be allocated. FIG. 13 shows the aforementioned processes arranged in chronological order.

Second, referring to FIG. 12, the scan report may be transmitted to eNB2, i.e., the serving cell of UE2 (1203). To this end, UE1 needs to be connected to eNB2. That is, UE1 needs to be connected to eNB2 by acquiring downlink synchronization of eNB2 and performing the random access procedure. When UE1 is assigned an uplink resource by the eNB in this procedure, it may transmit a scan report through this resource. In another example, a random access signal may carry a scan report. In this case, the random access signal may contain a scan report (detection result (Success/Fail)) and channel state information about the D2D link.

The scan report transmitted to eNB2 needs to be shared by eNB1 and eNB2. Accordingly, the scan report may be forwarded to eNB1. Alternatively, UE1 may switch back to the operating frequency band of the serving cell thereof, and then transmit the scan report to eNB1. If UE1 is already connected to eNB2 in the measurement interval and has an uplink resource assigned thereto, it may use this resource to transmit the scan report or make a request for uplink scheduling to eNB2.

Third, referring to FIG. 12, the scan report may be transmitted to UE2 (1205). That is, when UE1 receives a beacon signal through the simplified random access procedure described above, it may transmit the reception result to UE2. Additionally, it may also transmit a measured channel. In this case, eNB2 may pre-assign a resource for reporting, and include the corresponding resource region information in a beacon request/scan request to indicate the resource. The report resource region may be predetermined in the system.

Figure 14:
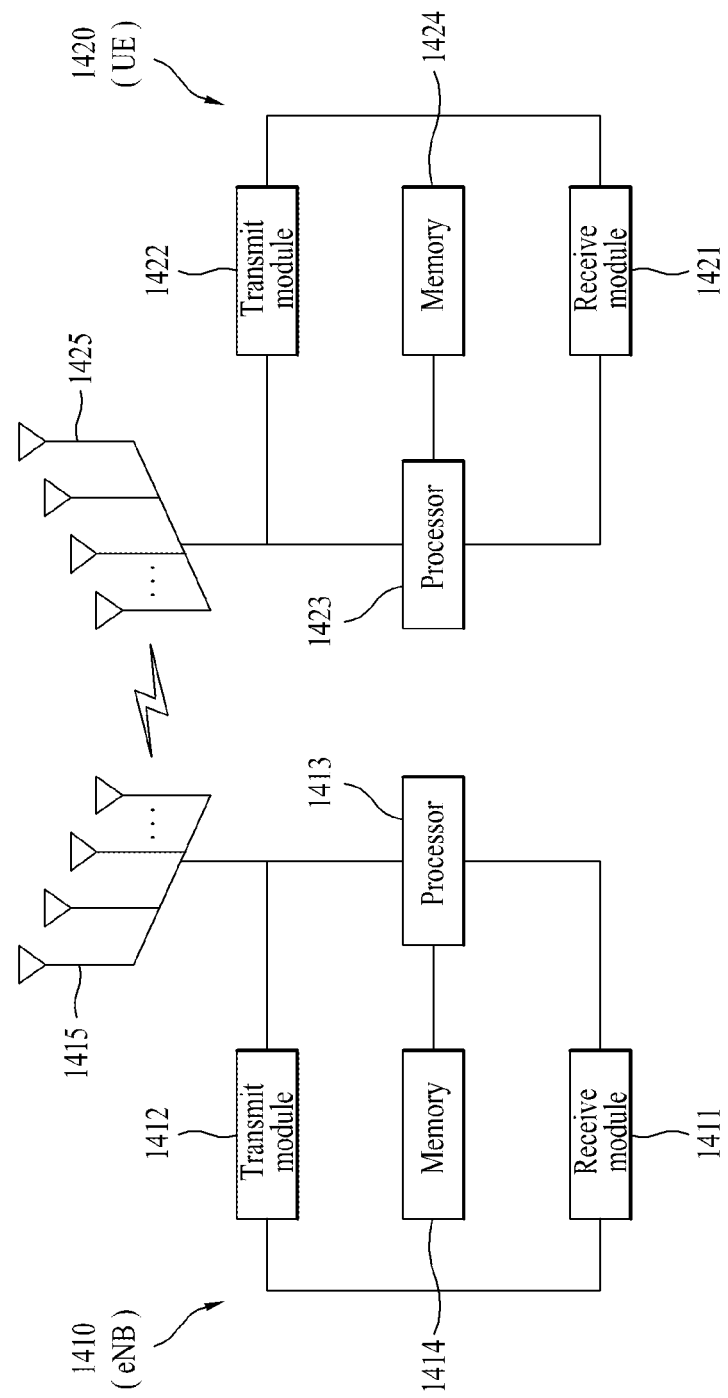
FIG. 14 is a diagram illustrating configuration of transceivers.

FIG. 14 is a diagram illustrating configurations of an eNB and a UE according to one embodiment of the present invention.

Referring to FIG. 14 an eNB 1410 may include a receive module 1411, a transmit module 1412, a processor 1413, a memory 1414, and a plurality of antennas 1415. The antennas 1415 represent a transmission point that supports MIMO transmission and reception. The receive module 1411 may receive various signals, data and information from a UE on uplink. The transmit module 1412 may transmit various signals, data and information to a UE on downlink. The processor 1413 may control overall operation of the eNB 1410.

The processor 1413 of the eNB 1410 according to one embodiment of the present invention may perform operations necessary for the embodiments described above.

Additionally, the processor 1413 of the eNB 1410 may function to computationally process information received by the eNB 1410 or information to be transmitted to the outside, etc. The memory 1414, which may be replaced with an element such as a buffer (not shown), may store the computationally processed information for a predetermined time.

Referring to FIG. 14, a UE 1420 may include a receive module 1421, a transmit module 1422, a processor 1423, a memory 1424, and a plurality of antennas 1425. The antennas 1425 mean that the UE supports MIMO transmission and reception. The receive module 1421 may receive various signals, data and information from an eNB on downlink. The transmit module 1422 may transmit various signals, data and information to the eNB on uplink. The processor 1423 may control overall operation of the UE 1420.

The processor 1423 of the UE 1420 according to one embodiment of the present invention may perform operations necessary for the embodiments described above.

Additionally, the processor 1423 may function to computationally process information received by the UE 1420 or information to be transmitted to the outside, and the memory 1424, which may be replaced with an element such as a buffer (not shown), may store the computationally processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1410 in FIG. 14 may also be applied to a relay which serves as a downlink transmitter or an uplink receiver, and description of the UE 1420 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for transmitting and receiving a signal for device-to-device (D2D) communication by a first user equipment (UE) in a wireless communication system, the method comprising:
 transmitting, by the first UE, a request for a measurement period and a request for carrier aggregation reconfiguration;
 switching, by the first UE, a frequency band of a second receiver for a secondary serving cell of the first UE to a frequency band of a serving cell of a second UE while maintaining a frequency band of a first receiver for a primary serving cell of the first UE during the measurement period;
 acquiring, by the first UE, downlink synchronization of the serving cell of the second UE through the frequency band of the serving cell of the second UE, using the second receiver;
 transmitting, by the first UE, a random access preamble;
 receiving, by the first UE, a random access response containing timing advance in response to transmission of the random access preamble through the frequency band of the serving cell of the second UE, using the second receiver; and
 receiving, by the first UE, a beacon signal transmitted by the second UE on the basis of the timing advance through the frequency band of the serving cell of the second UE, using the second receiver,
 wherein the request for the carrier aggregation reconfiguration includes a request for deactivation of the secondary serving cell of the first UE during the measurement period.

2. The method according to claim 1, wherein, when the first UE receives the beacon signal, the first UE assumes that the timing advance is timing advance of the second UE.

3. The method according to claim 1, further comprising:
 transmitting information related to an acknowledgement of reception of the beacon signal to the second UE,
 wherein the information transmitted to the second UE is forwarded to a serving base station of the second UE.

4. The method according to claim 3, wherein the information related to the acknowledgement of reception of the beacon signal is transmitted through a resource region indicated in a scan request, the scan request being transmitted by a serving base station of the first UE.

5. The method according to claim 3, wherein the information related to the acknowledgement of reception of the beacon signal is transmitted through a resource region indicated in the random access response.

6. The method according to claim 1, further comprising:
 transmitting information related to an acknowledgement of reception of the beacon signal to a serving base station of the second UE,
 wherein the information related to the acknowledgement of reception of the beacon signal is transmitted through a resource region indicated in the random access response.

7. The method according to claim 1, wherein an operating frequency of a serving base station of the first UE is different from an operating frequency of a serving base station of the second UE.

8. The method according to claim 1,
 wherein when the first UE acquires the downlink synchronization of the serving cell of the second UE and receives the random access response, the first UE switches the frequency band of the second receiver to a downlink frequency band of the serving cell of the second UE,
 wherein when the first UE receives the beacon signal from the second UE, the first UE switches the frequency band of the second receiver to an uplink frequency band of the serving cell of the second UE.

9. A first user equipment (UE) for transmitting and receiving a signal for device-to-device (D2D) communication in a communication system, the first UE comprising:
 a transmit module;
 a receive module comprising a first receiver module for a primary serving cell of the first UE and a second receiver module for a secondary serving cell of the first UE; and
 a processor that controls the transmit module and the receive module to:
 transmit a request for a measurement period and a request for carrier aggregation reconfiguration,
 switch a frequency band of the second receiver module to a frequency band of a serving cell of a second UE while maintaining a frequency band of the first receiver module during the measurement period,
 acquire downlink synchronization of the serving cell of the second UE through the frequency band of the serving cell of the second UE, using the second receiver,
 transmit a random access preamble,
 receive a random access response containing timing advance in response to transmission of the random access preamble through the frequency band of the serving cell of the second UE, using the second receiver, and
 receive a beacon signal transmitted by the second UE on the basis of the timing advance through the frequency band of the serving cell of the second UE, using the second receiver,
 wherein the request for the carrier aggregation reconfiguration includes a request for deactivation of the secondary cell during the measurement period.

10. The first UE according to claim 9,
 wherein when the first UE acquires the downlink synchronization of the serving cell of the second UE and receives the random access response, the first UE switches the frequency band of the second receiver to a downlink frequency band of the serving cell of the second UE,
 wherein when the first UE receives the beacon signal from the second UE, the first UE switches the frequency band of the second receiver to an uplink frequency band of the serving cell of the second UE.

* * * * *